United States Patent
Salter et al.

(10) Patent No.: US 9,987,962 B1
(45) Date of Patent: Jun. 5, 2018

(54) VEHICLE HAPTIC FEEDBACK AS A FUNCTION OF SENSED CAPACITANCE

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Arthur Van Jack, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/454,576

(22) Filed: Mar. 9, 2017

(51) Int. Cl.
*B60Q 1/00* (2006.01)
*B60N 2/44* (2006.01)
*B60Q 9/00* (2006.01)

(52) U.S. Cl.
CPC .............. *B60N 2/90* (2018.02); *B60N 2/44* (2013.01); *B60Q 9/008* (2013.01); *B60N 2002/4485* (2013.01); *B60N 2002/981* (2018.02)

(58) Field of Classification Search
CPC ...... B60N 2/002; G06F 3/016; A61B 5/04085
USPC ....................................................... 340/425.5
See application file for complete search history.

(56) References Cited

U.S. PATENT DOCUMENTS

| | | | |
|---|---|---|---|
| 9,424,124 B2 | 8/2016 | Georgakos et al. | |
| 2007/0027599 A1* | 2/2007 | Sakai | B60N 2/4885 701/49 |
| 2016/0228063 A1* | 8/2016 | Fukuyama | A61B 5/6893 |
| 2017/0021762 A1* | 1/2017 | Daman | B60Q 9/00 |

OTHER PUBLICATIONS

Hogema et al., A Tactile Seat for Direction Coding in Car Driving: Field Evaluation, http://ieeexplore.ieee.org/abstract/document/5196671/, 3 pages, accessed from internet Jan. 24, 2017.
Ji et al., Haptic Perceptions in the Vehicle Seat, Human Factors and Ergonomics in Manufacturing & Service Industries, Nov. 19, 2010, vol. 21, Issue 3, http://onlinelibrary.wiley.com/doi/10.1002/hfm.20235/full, 3 pages, accessed from internet Jan. 24, 2017.
Fels et al., Investigation of Haptic Feedback in the Driver Seat, http:ieeexploreieee.org/abstract/document/1706804/, 3 pages, accessed from internet Jan. 24, 2017.
Duthoit et al., Perceived Intensity of Vibrotactile Stimuli: Do Your Clothes Really Matter?, Haptics: Perception, Devices, Control, and Applications, vol. 9774 of the series Lecture Notes in Computer Science, Jul. 3, 2016, pp. 412-418, http://link.springer.com/chapter/10.1007/978-3-319-42321-0_38, 5 pages, accessed from internet Jan. 24, 2017.

(Continued)

*Primary Examiner* — Fabricio R Murillo Garcia
(74) *Attorney, Agent, or Firm* — Vichit Chea; Price Heneveld LLP (57) ABSTRACT

A method of delivering haptic feedback to a vehicle occupant comprising: measuring capacitance with a capacitive sensor having a known natural capacitance oriented within a vehicle to provide a measured capacitance value; determining, as a function of the measured capacitance value, an intensity level of haptic feedback to be provided by a haptic feedback generator oriented within the vehicle; and generating haptic feedback at the intensity level to a vehicle occupant.

20 Claims, 6 Drawing Sheets

(56) References Cited

OTHER PUBLICATIONS

Riener et al., Reconfiguration of Vibro-tactile Feedback Based on Drivers' Sitting Attitude, http://ieeexplore.ieee.org/abstract/document/4782520/, 2 pages, accessed from internet Jan. 24, 2017.

* cited by examiner

VEHICLE HAPTIC FEEDBACK AS A FUNCTION OF SENSED CAPACITANCE

FIELD OF THE INVENTION

The present invention generally relates to the provision of haptic feedback to vehicle operators.

BACKGROUND OF THE INVENTION

Haptic feedback is the use of a person's sense of touch to relay information. Just as a red traffic light uses a person's sense of sight to relay information—that the person does not have a right of way—devices that employ haptic feedback use a person's sense of touch to relay information. An example of haptic feedback is a mobile phone that vibrates to indicate an incoming phone call. The phone user feels the vibration and now knows that there is an incoming call.

There have been efforts made to utilize haptic feedback in vehicles—such as the driver's seat. Unfortunately, if a driver is wearing relatively thick clothing, then the driver may not feel the haptic feedback that the seat is attempting to provide. For example, it may be winter and the driver is accordingly wearing a thick coat. In such a circumstance, the thick coat may prevent the driver from feeling haptic feedback from the seat.

In addition, the driver may be wearing clothing of inconsistent thickness. For example, the driver may be wearing a thick coat but thin pants. Therefore, any haptic feedback that the seat provides will feel inconsistent—the driver may feel the haptic feedback on the driver's legs at a certain intensity but at a lesser intensity on the driver's back or not at all. Similarly, driver posture may affect how intense seat haptic feedback feels at various locations on the driver's body.

SUMMARY OF THE INVENTION

According to a first aspect of the present invention, a method of delivering haptic feedback to a vehicle occupant comprises: measuring capacitance with a capacitive sensor having a known natural capacitance oriented within a vehicle to provide a measured capacitance value; determining, as a function of the measured capacitance value, an intensity level of haptic feedback to be provided by a haptic feedback generator oriented within the vehicle; and generating haptic feedback at the intensity level to a vehicle occupant.

Embodiments of the first aspect of the invention can include any one or a combination of the following features:
  the intensity level is proportional to the measured capacitance value;
  wherein determining, as a function of the measured capacitance value, an intensity level of haptic feedback provided by a haptic feedback generator oriented within the vehicle includes determining the difference between the measured capacitance value and the known natural capacitance to provide a change in capacitance value; and the intensity level is inversely proportional to the change in capacitance value;
  the method further comprises measuring capacitance with a second capacitive sensor having a second known natural capacitance oriented within the vehicle to provide a second measured capacitance value, and wherein, determining, as a function of the measured capacitance value, an intensity level of haptic feedback provided by a haptic feedback generator oriented within the vehicle, includes determining, as a function of both the measured capacitance value and the second measured capacitance value, the intensity level;
  the haptic feedback generator is oriented to provide haptic feedback to a predetermined area that is different than where the capacitive sensor and the second capacitive sensor are oriented;
  the haptic feedback generator is adjacent the capacitive sensor;
  the method further comprises filtering the measured capacitance to ignore transient changes in the measured capacitance value; and
  the method further comprises filtering the change in capacitance value to ignore transient changes in the change in capacitance value.

According to a second aspect of the present invention, a method of delivering haptic feedback to a vehicle operator comprises: providing a vehicle comprising an outer seat surface, a plurality of haptic feedback generators each oriented to generate haptic feedback to a predetermined area on the outer seat surface and each capable of generating haptic feedback at a range of intensity levels, a plurality of capacitive sensors each having a known natural capacitance and each oriented below a predetermined area on the outer seat surface to measure capacitance and to provide a measured capacitance value, and a controller that receives the measured capacitance value provided by each of the plurality of capacitive sensors and determines an intensity level of the haptic feedback that one or more of the plurality of haptic feedback generators will generate based on the measured capacitance value; receiving the measured capacitance values provided by each of the plurality of capacitive sensors; determining that one or more of the plurality of haptic feedback generators will generate haptic feedback; determining, based on the measured capacitance values provided by one or more of the plurality of capacitive sensors, the intensity level of the haptic feedback that one or more of the plurality of haptic feedback generators will generate; and causing one or more of the plurality of haptic feedback generators to generate haptic feedback at the intensity level.

Embodiments of the second aspect of the invention can include any one or a combination of the following features:
  the intensity level is proportional to the measured capacitance value;
  wherein determining, based on the measured capacitance values provided by one or more of the plurality of capacitive sensors, the intensity level of the haptic feedback that one or more of the plurality of haptic feedback generators will generate includes determining the difference between the measured capacitance value and the known natural capacitance to provide a change in capacitance value, and the intensity level is inversely proportional to the change in capacitance value;
  wherein determining, based on the measured capacitance values provided by one or more of the plurality of capacitive sensors, the intensity level of the haptic feedback that one or more of the plurality of haptic feedback generators will generate includes determining, based on the measured capacitance value provided by a first capacitive sensor, a first intensity level of haptic feedback that a first haptic feedback generator will generate, and determining, based on the measured capacitance value provided by a second capacitive sensor, a second intensity level of haptic feedback that a second haptic feedback generator will generate, and the first intensity level is different than the second intensity level;

wherein determining, based on the measured capacitance values provided by one or more of the plurality of capacitive sensors, the intensity level of the haptic feedback that one or more of the plurality of haptic feedback generators will generate, includes filtering the measured capacitance values to ignore transient changes; and wherein determining the difference between the measured capacitance value and the known natural capacitance to provide a change in capacitance value includes filtering the change in capacitance value to ignore transient changes.

According to a third aspect of the present invention, a vehicle seat comprises: an outer seat surface; a plurality of haptic feedback generators each oriented to generate haptic feedback to a predetermined area on the outer seat surface and each capable of generating haptic feedback at a range of intensity levels; a plurality of capacitive sensors each having a known natural capacitance and each oriented below a predetermined area on the outer seat surface to measure capacitance and to provide a measured capacitance value; and a controller that receives the measured capacitance value provided by each of the plurality of capacitive sensors and determines an intensity level of the haptic feedback that one or more of the plurality of haptic feedback generators will generate based on the measured capacitance value.

Embodiments of the third aspect of the invention can include any one or a combination of the following features:

the plurality of haptic feedback generators comprise eccentric mass motors;

the plurality of haptic feedback generators comprise linear resonant actuators; and the vehicle seat further comprises an inside seat surface and the plurality of capacitive sensors are attached to the inside seat surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
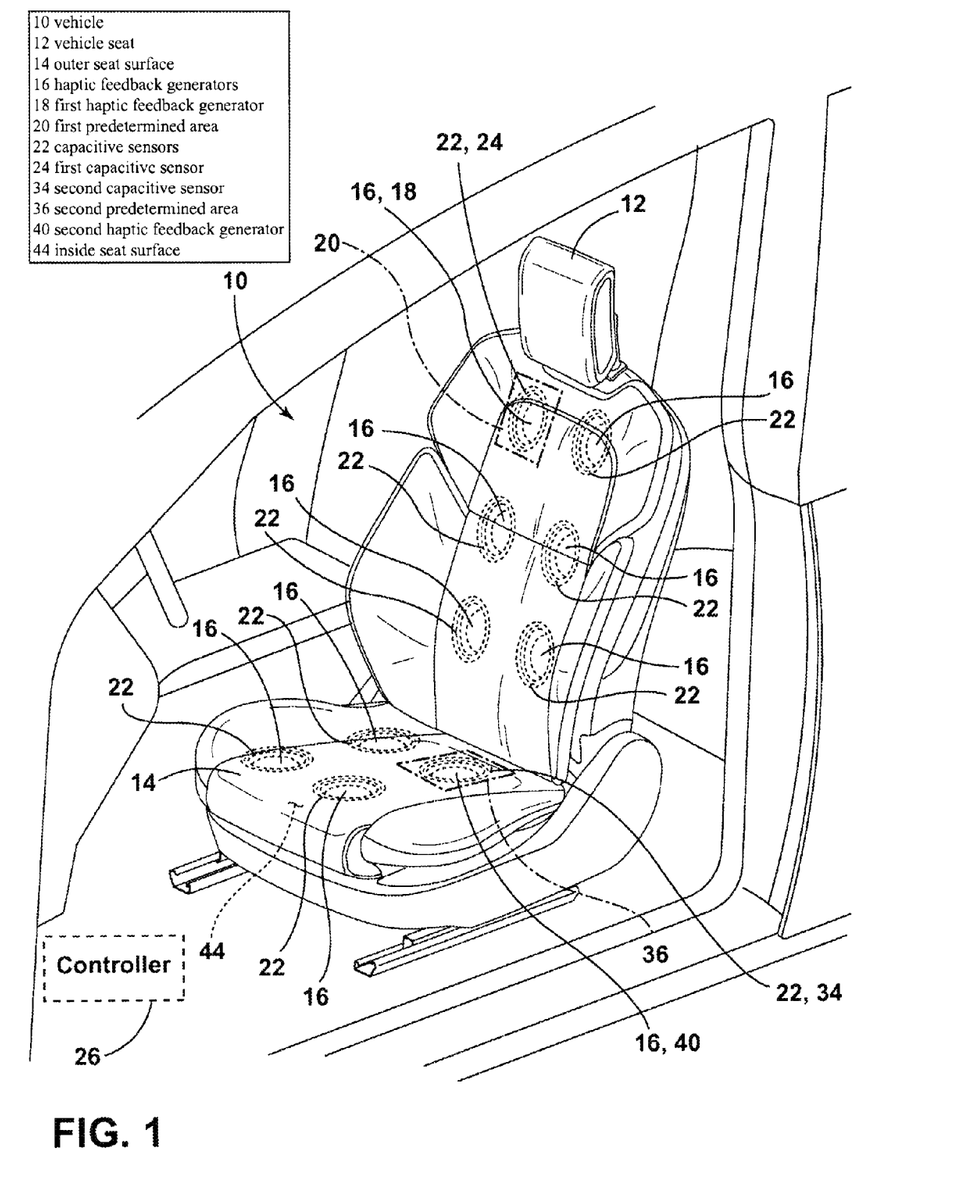
FIG. 1 is a perspective view of an interior of a vehicle including an embodiment of an operator's seat containing a plurality of haptic feedback generators and a plurality of capacitive sensors.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an interior of a vehicle 10 is illustrated. The vehicle 10 includes a vehicle seat 12 with an outer seat surface 14. A plurality of haptic feedback generators 16 are disposed within the vehicle seat 12 under the outer seat surface 14.

The plurality of haptic feedback generators 16 are each oriented to generate haptic feedback to a predetermined area on the outer seat surface 14. For example, in the embodiment illustrated in FIG. 1, the plurality of haptic feedback generators 16 includes a first haptic feedback generator 18. The first haptic feedback generator 18 is located beneath a first predetermined area 20 on the outer seat surface 14 and thus is oriented to generate haptic feedback to that first predetermined area 20 on the outer seat surface 14. In general, a haptic feedback generator is located underneath the area on the outer seat surface 14 where haptic feedback is desired to be felt by a person occupying the seat. For example, if it is desirable for a seat occupant to feel haptic feedback near the upper right part of the occupant's back, then the haptic feedback generator should be oriented beneath the portion of the outer seat surface 14 that is most likely to contact the upper right part of the occupant's back. Each of the plurality of haptic feedback generators 16 are capable of generating haptic feedback at a range of intensity levels.

In the embodiment illustrated in FIG. 1, the plurality of haptic feedback generators 16 are sound speakers able to emit sound wave vibrations. Other examples of haptic feedback generators that can constitute the plurality of haptic feedback generators 16 include an eccentric rotating mass (ERM) vibration motor and a shaftless vibration motor (sometimes called a coin vibration motor). Precision Microdrives Limited (United Kingdom) manufactures the aforementioned motors, bearing names such as Pico Vibe and Pico Haptic. A linear resonant actuator, such as the Precision Haptic Z-axis linear resonant actuator by Precision Microdrives Limited or the Precision Haptic Y-axis linear resonant actuator by Precision Microdrives Limited, is another example haptic feedback generator. Shaftless vibration motors, ERMs, and linear resonant actuators all generate vibration as the form of haptic feedback.

The intensity of haptic feedback is the amount of energy transferred from the haptic feedback generator to the surrounding environment. The amount of energy transferred, in the case of vibrations, is a function of amplitude, frequency, and duration. In other words, the higher the amplitude of the vibration generated by the haptic feedback generator, the more intense the haptic feedback is. Changing the voltage supplied to shaftless vibration motors, ERMs, and linear resonant actuators changes the amplitude and thus the intensity, of the vibration, that these haptic feedback generators generate. With ERMs, changing the voltage supplied to the ERM affects the frequency of the vibration generated as well, which also factors into the intensity of the vibration. The longer the duration of the haptic feedback, the more intense the haptic feedback feels.

The vehicle seat 12 including a plurality of haptic feedback generators 16 can be the operator's seat. However, the vehicle seat 12 can be any of the passenger seats as well. The vehicle 10 can generate haptic feedback to a passenger as an entertainment option. For example, the plurality of haptic feedback generators 16 could be speakers producing an amount of bass the occupant can feel while watching a movie or listening to music.

The vehicle seat 12 additionally includes a plurality of capacitive sensors 22. A capacitive sensor utilizes a capacitor of a known natural capacitance value. The capacitive sensor in its natural state will generate a signal of capacitance value matching the known natural capacitance value. An object placed within the electric field generated by the capacitor will lower the capacitance of the capacitor. Therefore, the capacitive sensor will generate a signal of this lowered capacitance value.

As long as the object placed within the field is more conductive than air (i.e., has a higher relative permittivity/dielectric constant than air), the capacitance of the capacitor will decrease and thus the capacitive sensor will produce a signal of lowered capacitance value. The human body, containing much water, is more conductive than a clothing material such as cotton. Therefore, a capacitive sensor will generate a signal of lower capacitance value when a human body is placed within the electric field than when an object made of cotton is so placed. In addition, the closer an object is to the capacitor, the more the object will lower the capacitance of the capacitor. Therefore, the closer a human body gets to the capacitive sensor, the more the capacitance of a capacitive sensor decreases from the known natural capacitance. In other words, the closer a human body gets to the capacitive sensor, the lower the signal of capacitive value the capacitive sensor will produce.

Clothing can separate the human body from a capacitive sensor. The thicker the clothing covering the human body is, the less charge the human body draws from the capacitive sensor. Thus, the thicker the clothing the human body is, the closer the capacitance value of the capacitive sensor will be to the known natural capacitance value. For these reasons, the capacitance value that a capacitive sensor generates can be used to approximate the distance between the body of the seat occupant and the vehicle seat. In turn, the further the distance between the body of the seat occupant and the vehicle seat, the more intense haptic feedback needs to be for the seat occupant to feel the haptic feedback. The closer the distance between the body of the seat occupant and the vehicle seat, the less intense haptic feedback needs to be for the seat occupant to feel the haptic feedback.

The plurality of capacitive sensors 22, each having a known natural capacitance, are each oriented below a predetermined area on the outer seat surface 14 to measure capacitance and to provide a measured capacitance value. For example, in the embodiment of a vehicle seat 12 illustrated in FIG. 1, the plurality of capacitive sensors 22 includes a first capacitive sensor 24. The first capacitive sensor 24 is oriented below the first predetermined area 20 on the outer seat surface 14. Thus, the first capacitive sensor 24 is oriented to measure capacitance and provide a measured capacitance value when an object (such as the upper right part of a vehicle operator's back) is located at the first predetermined area 20 on the outer seat surface 14. Each of the plurality of capacitive sensors 22 are individually able to provide a separate measured capacitance value relative to a separate predetermined area on the outer seat surface 14.

In this embodiment, the plurality of capacitive sensors 22 are attached to the inside seat surface 44, each generally surrounding one of the pluralities of haptic feedback generators 16. The plurality of capacitive sensors 22 could be printed directly onto the inside seat surface 44.

Figure 2:
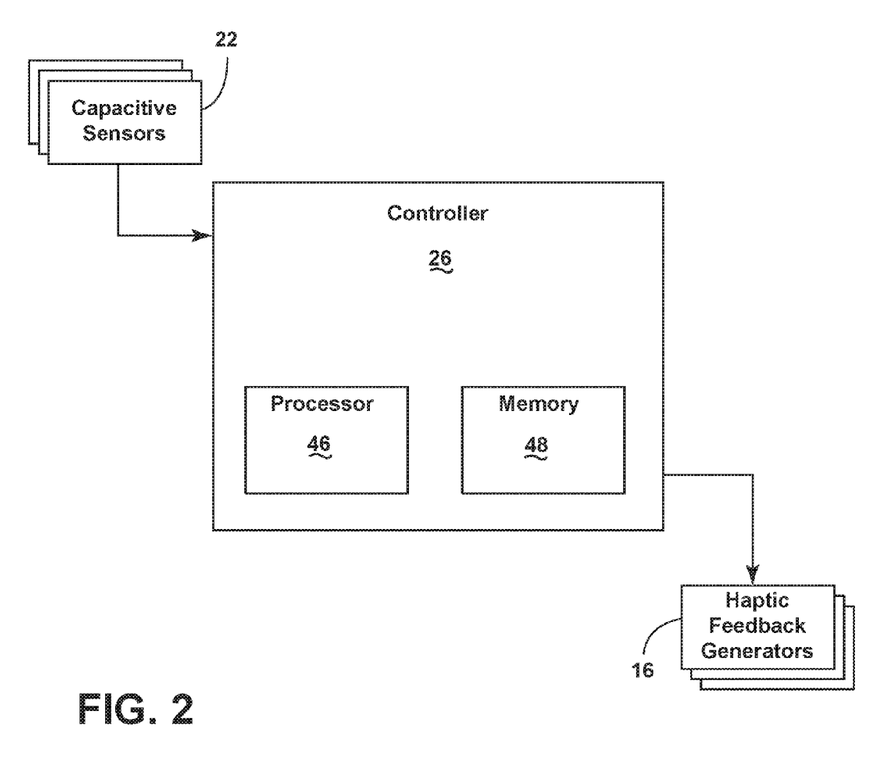
FIG. 2 is a diagram of a controller utilizing input signals generated by a plurality of capacitive sensors to calculate output signals instructing a plurality of haptic feedback generators.

The vehicle 10 further includes a controller 26 which may include a processor 46, as illustrated in FIG. 2. The processor 46 may correspond to one or more circuits configured to receive signals and information from a variety of vehicle systems and peripherals. The processor 46 may correspond to one or more microprocessors, circuits, application specific integrated circuits (ASIC), and/or related processing devices. The processor 46 may be in communication with a memory 48. The memory 48 may correspond to random access memory (RAM), read only memory (ROM), magnetic disc storage media, optical storage media, flash memory devices, etc. In various embodiments, the memory 48 may be configured to store machine readable information or routines to enable various processes and methods disclosed herein.

Figure 3:
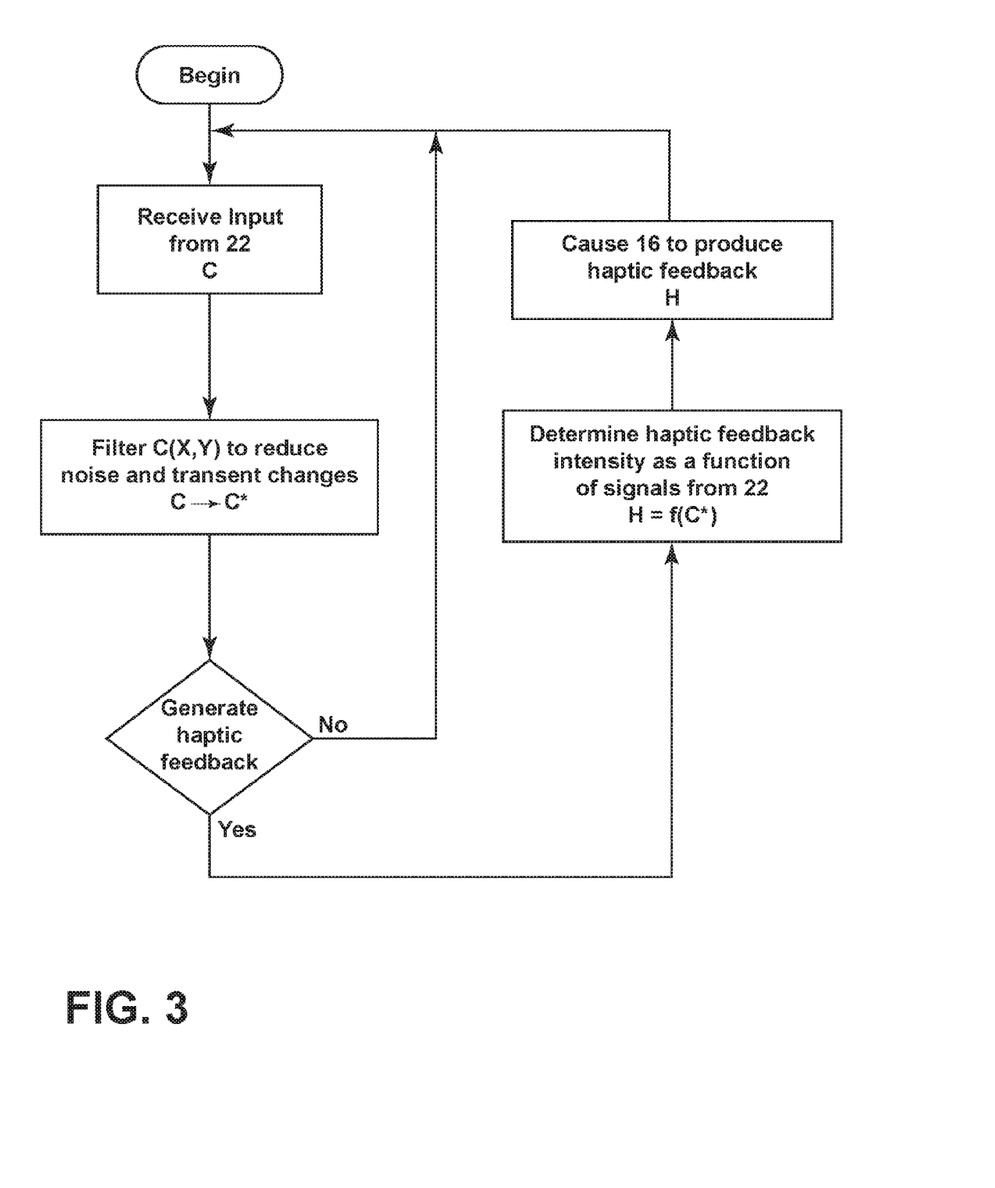
FIG. 3 is a decision tree for the controller of FIG. 2 calculating haptic feedback intensity as a function of input provided by capacitive sensors.

As illustrated in FIGS. 2 and 3, the controller 26 receives the measured capacitance value provided by each of the plurality of capacitive sensors 22. In general, the controller 26 subsequently determines an intensity level of the haptic feedback that one or more of the plurality of haptic feedback generators 16 should generate. This determination is based on the measured capacitance value provided by one or more of the plurality of capacitive sensors 22. In other words, the controller 26 determines intensity level of haptic feedback as a function of measured capacitance value.

As more specifically illustrated in FIG. 3, the controller 26 receives the input from the plurality of capacitive sensors 22 in the form of measured capacitance values ("C"). The controller 26 optionally filters the measured capacitance values to reduce noise and transient changes ("C*"). The controller 26 then determines whether to instruct any of the plurality of haptic feedback generators 16 to generate haptic feedback. If the controller 26 determines not to instruct any of the plurality of haptic feedback generators 16 to generate haptic feedback, then the process starts over. However, if the controller 26 determines to instruct one or more of the plurality of haptic feedback generators 16 to generate haptic feedback, then the controller 26 determines the intensity of haptic feedback to generate as a function of the measured capacitance value received from one or more of the plurality of capacitive sensors 22 ("H=f(C*)"). The controller 26 then instructs one or more of the plurality of haptic feedback generators 16 to generate haptic feedback at the determined intensity. This process is explained in greater detail, in connection with the following example.

Figure 4:
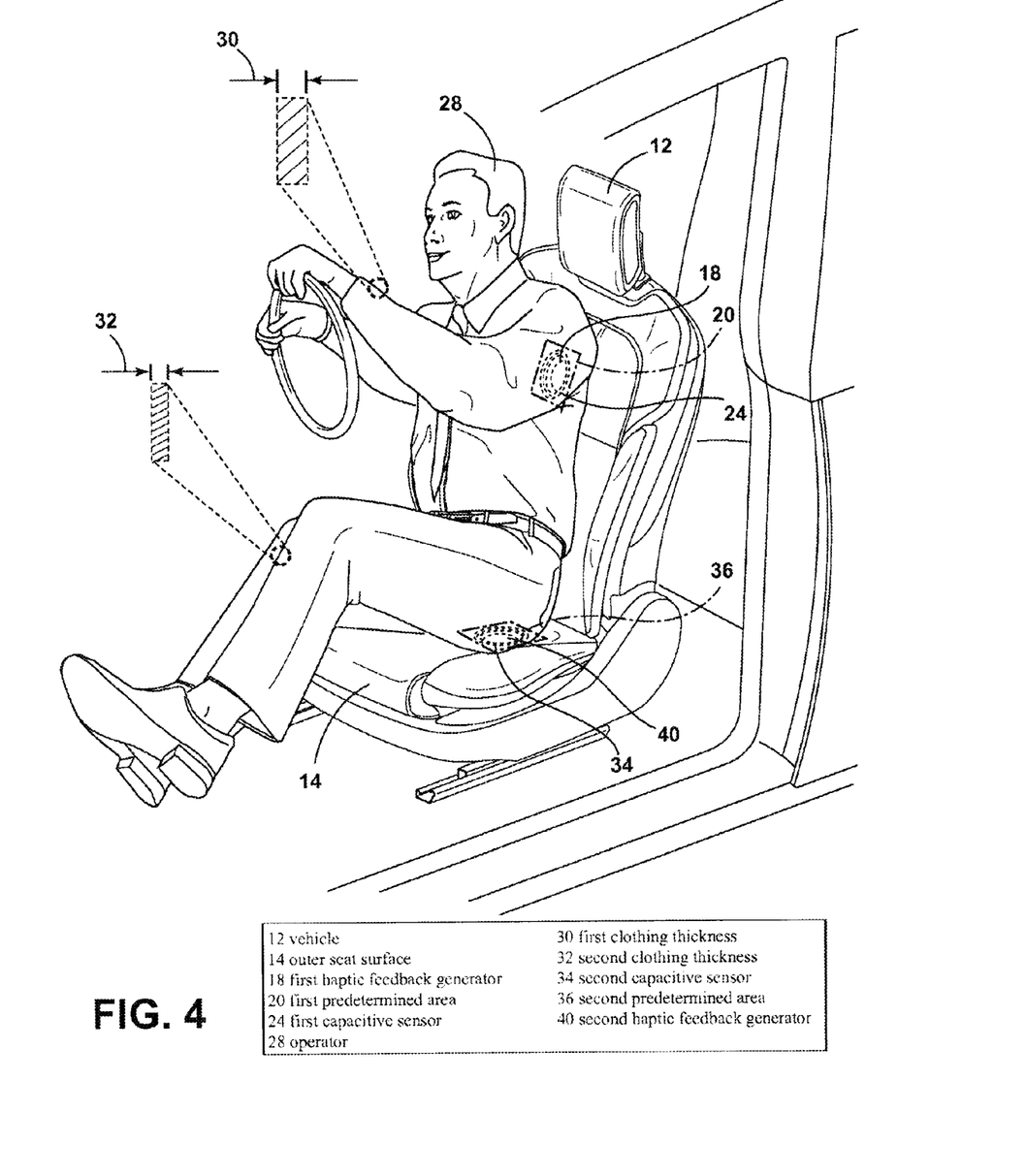
FIG. 4 is a perspective view of a vehicle operator sitting on the operator's seat of FIG. 1 while wearing clothing of a first clothing thickness and a second clothing thickness.

Referring now to FIG. 4, we consider an example of a method of delivering haptic feedback to a vehicle operator 28 sitting on the outer seat surface 14 of the vehicle seat 12 of FIG. 1. The vehicle operator 28 is wearing clothing of more than one thickness—specifically a first clothing thickness 30 and a second clothing thickness 32. In this example, the first clothing thickness 30 is greater than the second clothing thickness 32. The first haptic feedback generator 18 is oriented to generate haptic feedback to the first predetermined area 20 on the outer seat surface 14, which is separated from the body of the vehicle operator 28 by the first clothing thickness 30. A second haptic feedback generator 40 is oriented to generate haptic feedback to a second predetermined area 36 on the outer seat surface 14, which is separated from the body of the vehicle operator 28 by the second clothing thickness 32. Both the first haptic feedback generator 18 and the second haptic feedback generator 40 are capable of generating haptic feedback at a range of intensity levels.

Among the plurality of capacitive sensors 22, the first capacitive sensor 24, having a known natural capacitance, is oriented below the first predetermined area 20. Additionally, a second capacitive sensor 34, also having a known natural capacitance, is oriented below the second predetermined area 36. The first clothing thickness 30 is separating the body of the vehicle operator 28 from the first capacitive sensor 24 more than the second clothing thickness 32 is separating the body of the vehicle operator 28 from the second capacitive sensor 34, because the first clothing thickness 30 is thicker than the second clothing thickness 32. As a consequence, everything else being equal, the first capacitive sensor 24 will provide a measured capacitance value that is higher than the measured capacitance value that the second capacitive sensor 34 will provide. The body of the vehicle operator 28 is further from the first capacitive sensor 24 than it is from second capacitive sensor 34, thus draws less charge from the capacitor of the first capacitive sensor 24, and thus the first capacitive sensor 24 provides a higher measured capacitance value closer to the known natural capacitance value than the second capacitive sensor 34 does.

The controller 26 receives the measured capacitance values separately provided by the first capacitive sensor 24 and the second capacitive sensor 34. The controller 26 determines whether one or more of the plurality of haptic feedback generators 16 should generate haptic feedback. If the controller 26 determines that the generation of haptic feedback is unnecessary, then the controller 26 returns to the beginning of this continuous process and continues to receive measured capacitance values from the plurality of capacitive sensors 22.

However, the controller 26 may determine that one or more of the plurality of haptic feedback generators 16 will generate haptic feedback. In this example, the controller 26 may be programmed to determine that the first haptic feedback generator 18 and the second haptic feedback generator 40 will generate haptic feedback when the vehicle 10 senses the presence of another vehicle in the blind spot of the vehicle 10. It should be understood that the controller 26 may be programmed to cause the generation of haptic feedback if any of numerous conditions are satisfied and the blind spot example is just one illustrative example and not meant to be limiting.

In such a circumstance, the controller 26 determines, based on the measured capacitance values separately provided by the first capacitive sensor 24 and the second capacitive sensor 34, the intensity level of the haptic feedback that the first haptic feedback generator 18 and the second haptic feedback generator 40 will generate. In other words, the controller 26 determines, based on the measured capacitance value provided by the first capacitive sensor 24, a first intensity level of haptic feedback that the first haptic feedback generator 18 will generate and, based on the measured capacitance value provided by the second capacitive sensor 34, a second intensity level of haptic feedback that the second haptic feedback generator 40 will generate. The first intensity level and the second intensity level can be, and are, different in this example.

More specifically, because the first capacitive sensor 24 provides a higher measured capacitance value to the controller 26 than the second capacitive sensor 34, the controller 26 determines that the intensity level of the haptic feedback that the first haptic feedback generator 18 will generate is higher than the intensity level of the haptic feedback that the second haptic feedback generator 40 will generate. The first haptic feedback generator 18 needs to generate haptic feedback of higher intensity than the second haptic feedback generator 40, because the first clothing thickness 30 separates the body of the vehicle operator 28 from the first haptic feedback generator 18 more than the second clothing thickness 32 separates the body of the vehicle operator 28 from the second haptic feedback generator 40. The higher haptic feedback intensity is required to overcome the greater thickness in clothing, and although the intensities are different, they may now feel similar to the vehicle operator 28. The controller 26 thus causes the first haptic feedback generator 18 and the second haptic feedback generator 40 to generate haptic feedback at the respective intensity levels determined. The controller 26 then starts the process over again and receives the measured capacitance values provided by each of the plurality of capacitive sensors 22.

Figure 5:
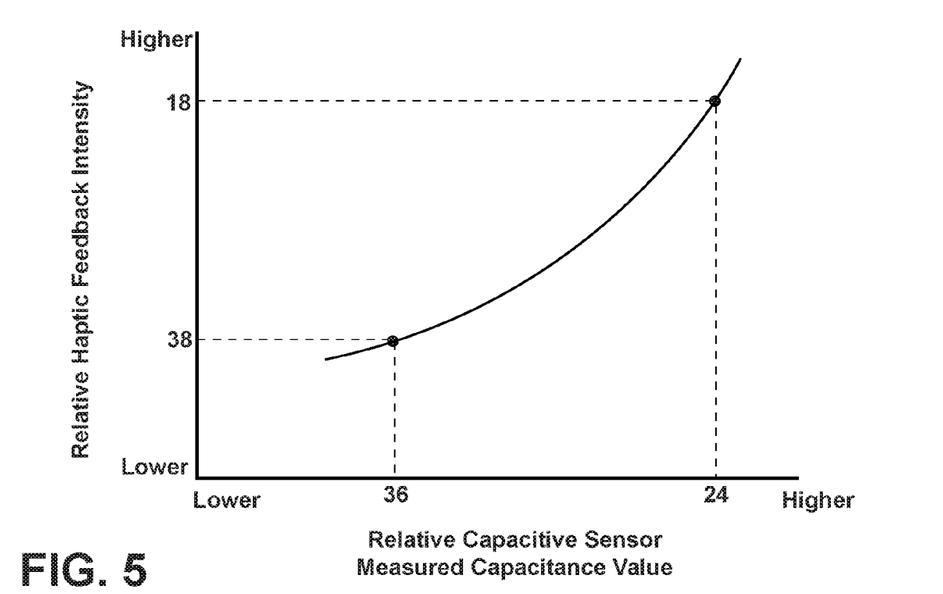
FIG. 5 is a conceptual graph demonstrating the proportional relationship between haptic feedback intensity and measured capacitance value.

In this example, the controller 26 determined intensity level of haptic feedback to be generated on a proportional basis to the measured capacitance. In other words, the higher the measured capacitance value that the controller 26 received in relation to a predetermined area, the higher the controller 26 determined the intensity of the haptic feedback generation to that predetermined area will be. This proportional relationship between measured capacitance value and intensity level of the haptic feedback is illustrated in the FIG. 5.

Instead of determining intensity directly from measured capacitance value, the controller 26 can first determine the difference between the measured capacitance value and the known natural capacitance value to identify the "delta" or "Δ" (i.e., the change in capacitance value). The controller 26 can utilize the change in capacitance value to determine the intensity level of haptic feedback to be generated, instead of the measured capacitance value. In other words, the act of determining, based on the measured capacitance provided by one or more of the plurality of capacitive sensors 22, the intensity level of the haptic feedback that one or more of the plurality of haptic feedback generators 16 will generate, can include determining the difference between the measured capacitance and the known natural capacitance to provide a change in capacitance value.

Figure 6:
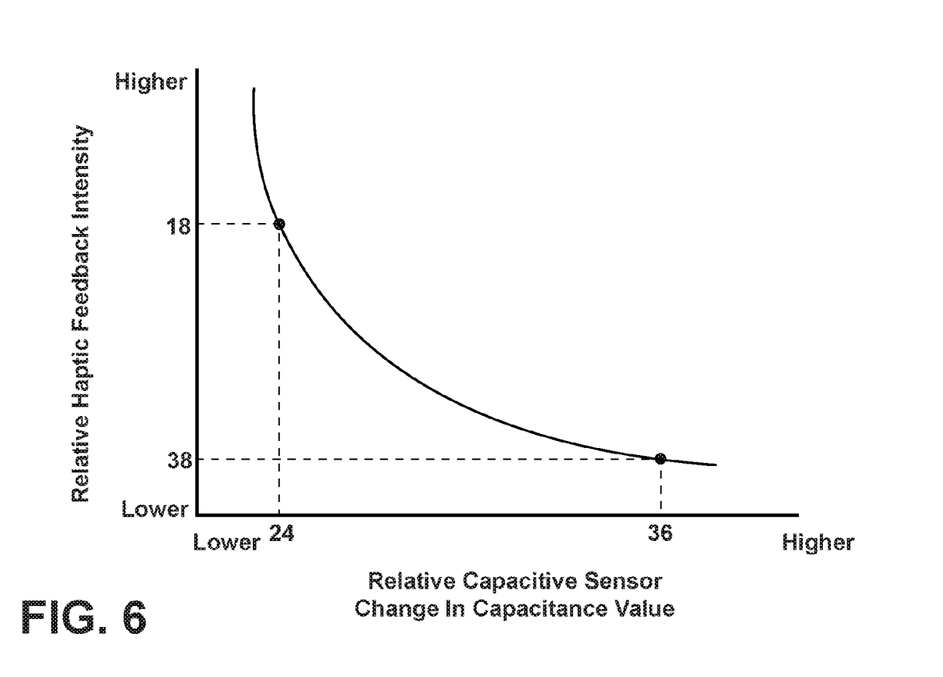
FIG. 6 is a conceptual graph demonstrating the inversely proportional relationship between haptic feedback intensity and the change in capacitance value from the known natural capacitance of a capacitive sensor.

To further the example above, the controller 26 can determine the difference between the measured capacitance value provided by the first capacitive sensor 24 and the known natural capacitance of the first capacitive sensor 24 to provide a change in capacitance value related to the first capacitive sensor 24. Similarly, the controller 26 can determine the difference between the measured capacitance value provided by the second capacitive sensor 34 and the known natural capacitance of the second capacitive sensor 34 to provide a change in capacitance value related to the second capacitive sensor 34. The change in capacitance value can be in terms of percentage change from the known natural capacitance. The change in capacitance value relating to the first capacitive sensor 24, in this example, would be lower than the change in capacitance value relating to the second capacitive sensor 34. The first clothing thickness 30 separated the human body of the vehicle operator 28 from the first capacitive sensor 24 more than the second clothing thickness 32 separated the human body of the vehicle operator 28 from the second capacitive sensor 34, and thus the capacitance of the first capacitive sensor 24 remained closer to its known natural capacitance. In such a circumstance, because the first capacitive sensor 24 provided a lower change in capacitance value to the controller 26 than the second capacitive sensor 34, the controller 26 determines that the intensity level of the haptic feedback that the first haptic feedback generator 18 will generate is higher than the intensity level of the haptic feedback that the second haptic feedback generator 40 will generate. Thus, the intensity level is inversely proportional to the change in capacitance value. The higher the change in capacitance value, the lower the intensity level—and vice versa. This inversely proportional relationship is illustrated in FIG. 6.

It may be advantageous for the controller 26 to utilize a change in capacitance value instead of the raw measured capacitance value. Humidity, temperature, coverings over the seat, and other factors can cause the measured capacitance to change. First transferring the measured capacitance value into a change in capacitance value helps nullify these concerns. It should be recognized that the determination of intensity level of haptic feedback is still inherently a function of the measured capacitance value—the measured capacitance value is just first manipulated into a change in capacitance value and the determination of intensity level is made using that change in capacitance value instead of the measured capacitance value directly.

An optional act in this method is to filter either the measured capacitance values or the change in capacitance values to ignore transient changes, as illustrated in FIG. 3. These transient changes in value could include noise in the signals and changes caused by momentary changes in posture. To further the example above, if the vehicle operator 28 had sat still in the operator's vehicle seat 12 for a period of time causing the plurality of capacitive sensors 22 to generate stable values, the vehicle operator 28 temporarily changing posture, such as when turning a steering wheel, would change the values generated. The optional step of filtering this change of values generated could be beneficial if the change of values was transient—that is, if the vehicle operator 28 thereafter returned to his previous posture in the vehicle seat 12.

In other words, the act of determining, based on the measured capacitance values provided by one or more of the plurality of capacitive sensors 22, the intensity level of the haptic feedback that one or more of the plurality of haptic feedback generators 16 can optionally include the act of filtering the measured capacitance values to ignore transient changes. The controller 26 then bases the determination of intensity level based on the filtered measured capacitance values. Similarly, if the controller 26 utilizes the change in capacitance value instead of the measured capacitance value, the act determining the difference between the measured capacitance value and the known natural capacitance to provide a change in capacitance value can optionally include filtering the change in capacitance value to ignore transient changes. The controller 26 then bases the determination of intensity level based on the filtered change in capacitance value.

In the embodiment of a vehicle seat 12 illustrated in FIG. 1 and in the example of a method describe above, each of the plurality of haptic feedback generators 16 were oriented to generate haptic feedback to a predetermined area on the outer seat surface 14 that was the generally the same as the predetermined area on the outer seat surface 14 below which one of the plurality of capacitive sensors 22 were oriented. In other words, one of the plurality of capacitive sensors 22 was matched with one of the plurality of haptic feedback generators 16 to serve the same predetermined area. The first capacitive sensor 24 was matched with the first haptic feedback generator 18 in relation to the first predetermined area 20, the second capacitive sensor 34 was matched with the second haptic feedback generator 40 in relation to the second predetermined area 36, and so on. Such a matching can be achieved when a haptic feedback generator is adjacent a capacitive sensor.

Figure 7:
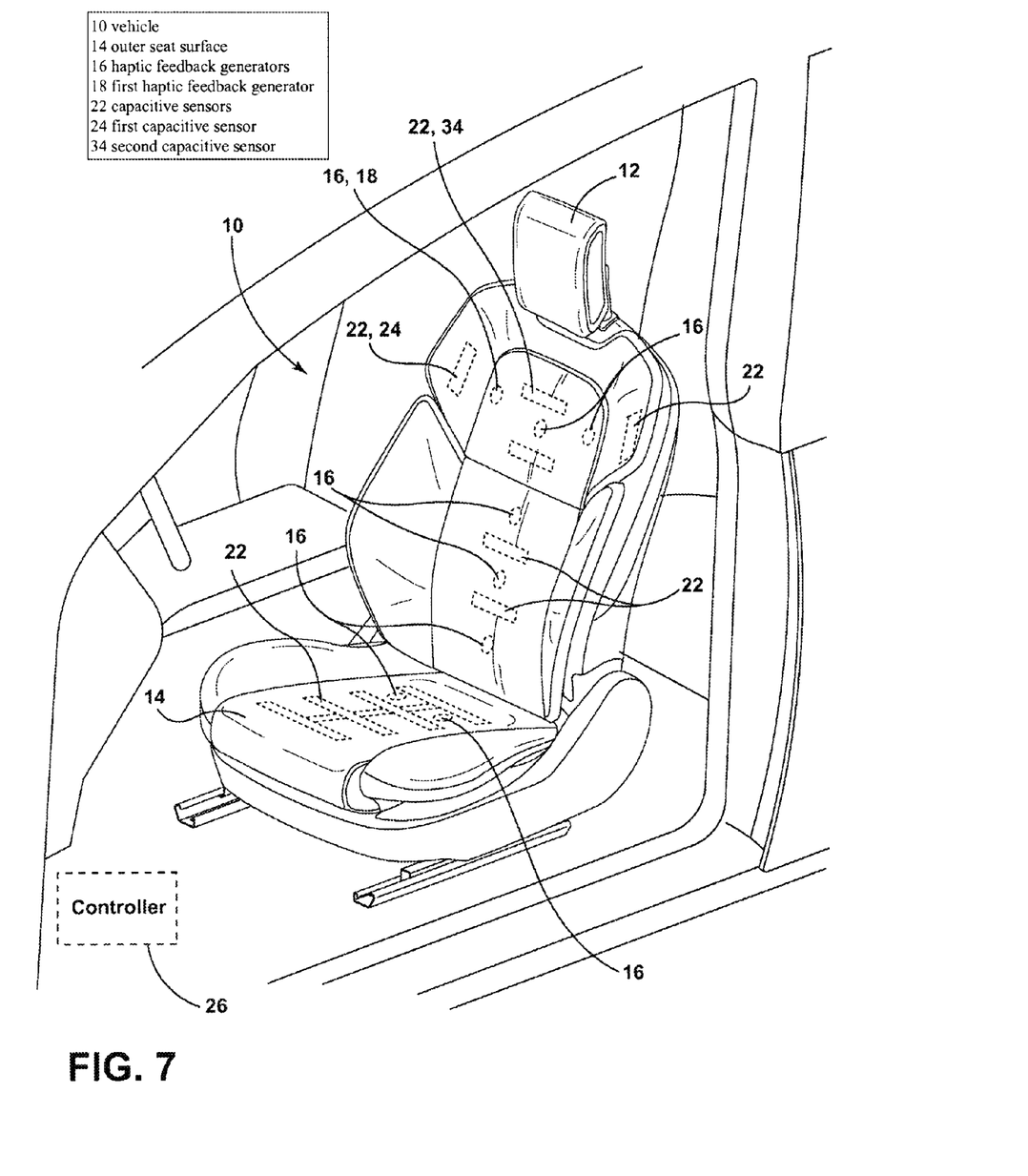
FIG. 7 is a perspective view of an interior of a vehicle including another embodiment of an operator's seat containing a plurality of haptic feedback generators and a plurality of capacitive sensors.

However, such a one-to-one relationship between the plurality of haptic feedback generators 16 and the plurality of capacitive sensors 22 is unnecessary. As illustrated in FIG. 7, in another embodiment of a vehicle seat 12, the plurality of haptic feedback generators 16 can be oriented to provide haptic feedback to a predetermined area on the outer seat surface 14 that is different than where the plurality of capacitive sensors 22 are oriented. For example, a first capacitive sensor 24 having a known capacitance is oriented in the vehicle 10 to measure capacitance and provide a first measured capacitance value. A second capacitive sensor 34 having a second known capacitance is oriented in the vehicle 10 to measure capacitance and provide a second measured capacitance value. A plurality of haptic feedback generators 16 are oriented within the vehicle 10, including a first haptic feedback generator 18. Note that the first haptic feedback generator 18 is oriented to provide haptic feedback to a predetermined area that is different than where the first capacitive sensor 24 and the second capacitive sensor 34 are oriented. A controller 26 can determine, as a function of both the first measured capacitance value and the second measured capacitance value (including change in capacitance value), the intensity level of haptic feedback to be provided by the first haptic feedback generator 18. The controller 26 can so determine intensity level by, for example, averaging the first measured capacitance value and the second measured capacitance value, or weighting one value more than the other. The first haptic feedback generator 18 can then generate haptic feedback at that determined intensity level. This concept allows the determination of intensity level of haptic feedback using the measured capacitance values from capacitive sensors that were oriented for purposes other than the generation of haptic feedback, such as capacitive sensors oriented for purposes of airbag deployment.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of delivering haptic feedback to a vehicle occupant comprising:
    measuring capacitance, to approximate a distance between the vehicle occupant and a seat of the vehicle that the vehicle occupant is occupying, with a capacitive sensor having a known natural capacitance oriented within the seat of the vehicle to provide a measured capacitance value;
    determining, as a function of the measured capacitance value, an intensity level of the haptic feedback to be provided by a haptic feedback generator oriented within the seat of the vehicle, such that the greater the distance between the vehicle occupant and the seat of the vehicle, the greater the intensity level; and
    generating the haptic feedback at the intensity level to the vehicle occupant.

2. The method of claim 1, wherein the intensity level is proportional to the measured capacitance value.

3. The method of claim 2 further comprising filtering the measured capacitance to ignore transient changes in the measured capacitance value.

4. The method of claim 1, wherein determining, as the function of the measured capacitance value, the intensity level of the haptic feedback provided by the haptic feedback generator oriented within the seat of the vehicle includes:
determining a difference between the measured capacitance value and the known natural capacitance to provide a change in capacitance value; and
the intensity level is inversely proportional to the change in capacitance value.

5. The method of claim 4 further comprising filtering the change in capacitance value to ignore transient changes in the change in capacitance value.

6. The method of claim 1 further comprising:
measuring capacitance with a second capacitive sensor having a second known natural capacitance oriented within the seat of the vehicle to provide a second measured capacitance value; and
wherein determining, as the function of the measured capacitance value, the intensity level of the haptic feedback provided by the haptic feedback generator oriented within the seat of the vehicle, includes determining, as a function of both the measured capacitance value and the second measured capacitance value, the intensity level.

7. The method of claim 6, wherein the haptic feedback generator is oriented to provide the haptic feedback to a predetermined area that is different than where the capacitive sensor and the second capacitive sensor are oriented.

8. The method of claim 6 further comprising filtering the measured capacitance to ignore transient changes in the measured capacitance value.

9. The method of claim 1, wherein the haptic feedback generator is adjacent the capacitive sensor.

10. The method of claim 1 further comprising filtering the measured capacitance to ignore transient changes in the measured capacitance value.

11. A method of delivering haptic feedback to a vehicle operator comprising:
providing a vehicle comprising:
a vehicle seat occupied by the vehicle operator, the vehicle seat having an outer seat surface;
a plurality of haptic feedback generators each oriented to generate the haptic feedback to a predetermined area on the outer seat surface and each capable of generating the haptic feedback at a range of intensity levels;
a plurality of capacitive sensors each having a known natural capacitance and each oriented below a predetermined area on the outer seat surface to measure capacitance and to provide a measured capacitance value; and
a controller that receives the measured capacitance value provided by each of the plurality of capacitive sensors and determines an intensity level of the haptic feedback that one or more of the plurality of haptic feedback generators will generate based on the measured capacitance value, such that the greater the distance between the vehicle operator and the outer seat surface, the greater the intensity level;
receiving the measured capacitance values provided by each of the plurality of capacitive sensors; generate haptic feedback;
determining that one or more of the plurality of haptic feedback generators will generate haptic feedback;
determining, based on the measured capacitance values provided by one or more of the plurality of capacitive sensors, the intensity level of the haptic feedback that one or more of the plurality of haptic feedback generators will generate; and
causing one or more of the plurality of haptic feedback generators to generate haptic feedback at the intensity level.

12. The method of claim 11, wherein the intensity level is proportional to the measured capacitance value.

13. The method of claim 11, wherein determining, based on the measured capacitance values provided by one or more of the plurality of capacitive sensors, the intensity level of the haptic feedback that one or more of the plurality of haptic feedback generators will generate includes:
determining the difference between the measured capacitance value and the known natural capacitance to provide a change in capacitance value; and
the intensity level is inversely proportional to the change in capacitance value.

14. The method of claim 13, wherein determining the difference between the measured capacitance value and the known natural capacitance to provide a change in capacitance value includes filtering the change in capacitance value to ignore transient changes.

15. The method of claim 11,
wherein determining, based on the measured capacitance values provided by one or more of the plurality of capacitive sensors, the intensity level of the haptic feedback that one or more of the plurality of haptic feedback generators will generate includes:
determining, based on the measured capacitance value provided by a first capacitive sensor, a first intensity level of the haptic feedback that a first haptic feedback generator will generate; and
determining, based on the measured capacitance value provided by a second capacitive sensor, a second intensity level of the haptic feedback that a second haptic feedback generator will generate; and
the first intensity level is different than the second intensity level.

16. The method of claim 11, wherein determining, based on the measured capacitance values provided by one or more of the plurality of capacitive sensors, the intensity level of the haptic feedback that one or more of the plurality of haptic feedback generators will generate, includes filtering the measured capacitance values to ignore transient changes.

17. A vehicle seat comprising:
an outer seat surface;
a plurality of haptic feedback generators each oriented to generate haptic feedback to a predetermined area on the outer seat surface and each capable of generating the haptic feedback at a range of intensity levels;
a plurality of capacitive sensors, to approximate a distance between a vehicle occupant and the outer seat surface, each having a known natural capacitance and each oriented below a predetermined area on the outer seat surface to measure capacitance and to provide a measured capacitance value; and
a controller that receives the measured capacitance value provided by each of the plurality of capacitive sensors and determines an intensity level of the haptic feedback that one or more of the plurality of haptic feedback generators will generate based on the measured capacitance value, such that the greater the distance between the vehicle operator and the outer seat surface, the greater the intensity level.

18. The vehicle seat of claim 17, wherein the plurality of haptic feedback generators comprise eccentric mass motors.

19. The vehicle seat of claim 17, wherein the plurality of haptic feedback generators comprise linear resonant actuators.

20. The vehicle seat of claim 17, wherein the vehicle seat further comprises an inside seat surface and the plurality of capacitive sensors are attached to the inside seat surface.

* * * * *

UNITED STATES PATENT AND TRADEMARK OFFICE
CERTIFICATE OF CORRECTION

| | |
|---|---|
| PATENT NO. | : 9,987,962 B1 |
| APPLICATION NO. | : 15/454576 |
| DATED | : June 5, 2018 |
| INVENTOR(S) | : Salter et al. |

Page 1 of 1

It is certified that error appears in the above-identified patent and that said Letters Patent is hereby corrected as shown below:

In the Claims

Column 11:
Claim 11, Lines 66-67:
After "capacitive sensors;"
Delete "generate haptic feedback;".

Signed and Sealed this
Fourth Day of September, 2018

Andrei Iancu
*Director of the United States Patent and Trademark Office*